July 30, 1957   R. L. BOWERS   2,801,009
FILTER HAVING OUTWARDLY EXTENDING PLEATS
Filed Feb. 10, 1954

INVENTOR
Roy L. Bowers
BY
C. H. Pitt
ATTORNEY

United States Patent Office 2,801,009
Patented July 30, 1957

2,801,009
FILTER HAVING OUTWARDLY EXTENDING PLEATS

Roy L. Bowers, Flint, Mich., assignor to General Motors Corporation, Detroit, Mich., a corporation of Delaware Application February 10, 1954, Serial No. 409,361

1 Claim. (Cl. 210—493)

This invention relates to filters and more particularly to an improved high capacity filter for treating liquids such as oils.

Oil filter structures usually have a cylindrical form with a passage leading through the center thereof and filters of this type are widely used in clarifying oil particularly in the automotive field. In the present instance the invention is illustrated in connection with a special filter of this broad general type and, for this reason, a conventional housing for the filter is not illustrated. When installed in an oil filter housing, an element of this general type is positioned on a centrally located outlet pipe leading from the housing, and an inlet pipe for the liquid to be treated leads through a wall of the housing. Upper and lower portions of the filter element engage the outlet pipe in sealed relationship so that unfiltered liquid admitted to the housing must pass through the filter element before discharging from the unit. In discharging, the cleaned liquid enters the outlet pipe through suitable apertures in the side of the latter and flows from the housing to a sump or place of use.

Heretofore, cylindrical filters constructed of sheet filter material have been produced utilizing pleats of curved form. The purpose in mind in providing the pleats was to increase the very limited capacity of prior known filters without increasing their size. Despite these expedients the filter capacities were not increased to the extent desired as the pleats in such filters were so intimately in contact that impurities filtered from a treated liquid penetrated only a short distance into the filter element. After a limited period of time, the surface layer of impurities blocked passage of the fluid and a major portion of the filter material remained inoperative. In other words, the limited amount of filter material in contact with the untreated liquid and the dormant condition of a major portion of the filter material detracted to a substantial extent from the filter efficiency desired.

Heretofore, in joining the end margins of a pleat of filter material to form a filter element, it has been customary to cement the edges of each pleat of the material to and in perpendicular relation with an end plate. This has unavoidably resulted, heretofore, in a slight space existing between the adjacent margins or edges of the sheet material close to the plane in which those edges abut the end plate. Subsequently imposed fluid pressure then would cause eventual rupture of the filter material adjacent the end plate and admit unfiltered fluid to the core of the filter element thereby polluting the fluid discharged from the element. When the pleats are curved outwardly in the filter element, the problem is accentuated as the spaces between the adjacent end margins of each pleat are more likely to be pronounced and variable due to necessary allowances in manufacture and rupture of the sheet material is more apt to occur.

An object of the present invention is to provide an improved filter having a large and effective filtering area in a compact space.

Another object of the invention is to provide an improved filter of high capacity in which the filtering material employed is utilized to perform its function to a maximum extent.

Another object of the invention is to provide a filter utilizing discrete pleats of filtering material, the pleats being separated by open pockets and so constructed as to withstand exteriorly applied pressure without rupture.

A feature of the present invention is a filter of cylindrical form having curved or spiral pleats of filter material extending outwardly and the filter material forming the pleats being crimped to form outwardly extending grooves.

Another feature of the invention is a filter formed from an endless strip of sheet filtering material made into curved or spiral pleats and crimped to form ridges running longitudinally of the sheet, the walls of each pleat being in contact and spaced from the adjacent pleats to define open pockets.

Another feature is a cylindrical filter comprising an endless strip of filtering material surrounding a core member and folded into outwardly extending curved pleats, the material being crimped to form ridges extending outwardly from the core member.

Still another feature is a filter of pleated sheet material, each pleat having its end margins in juxtaposed, fluid tight relation to resist exterior pressure without substantial strain.

These and other important features of the invention and novel combinations of parts will now be described in detail in the specification and pointed out more particularly in the appended claim.

Figure 1:
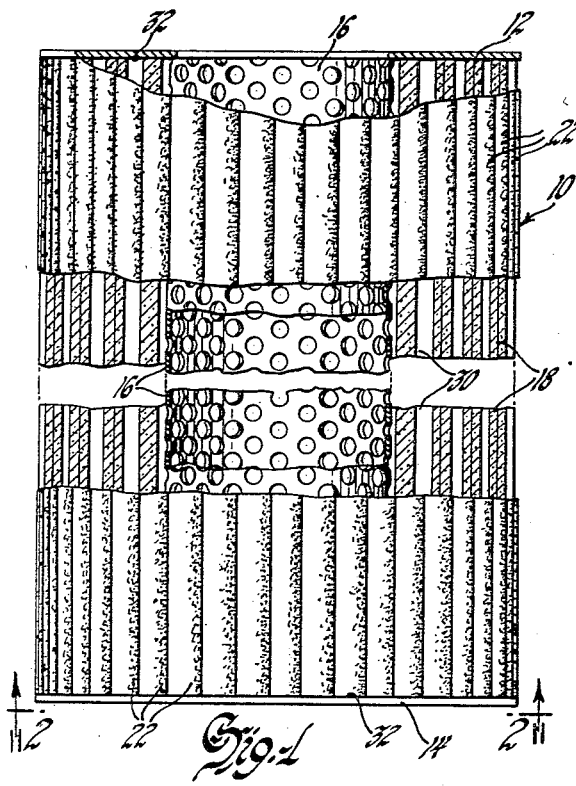
Fig. 1 is an elevational view, partially in section, illustrating one form of filter in which the present invention is embodied, parts being broken away more clearly to show certain features thereof.

Referring to the drawings, the filter element generally indicated at 10 comprises two centrally apertured end plates 12 and 14. These plates are circular, and concentric with their apertures is located a perforated central core member or tube 16 which preferably, but not necessarily, is made of thin metal. The ends of the tube 16 may or may not be attached by some means such as an adhesive resin or cement to the end plates 12 and 14. If desired, a coil of wire may be substituted for the tube 16 as the main function of the core member is to support the filter element 10 against external fluid pressure. Another function of the core member may be to space the end plates 12 and 14 properly.

Figure 3:
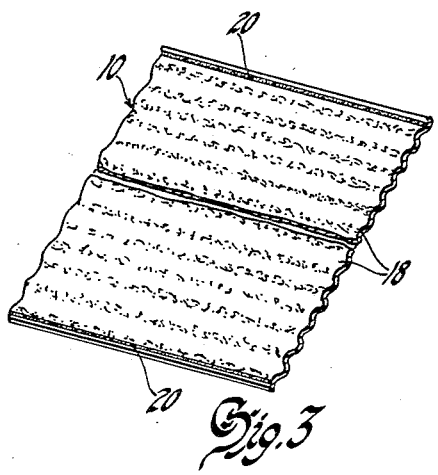
Fig. 3 is a perspective view of a short length of sheet filtering material employed in the filter element of Figs. 1 and 2.

A strip 18 of porous filter material such as resin impregnated filter paper is utilized in making the filter. The strip of filter material presents a relatively smooth surface on both sides thereof and is relatively weak in strength particularly when wet. In carrying out the present invention this relatively smooth sheet material is moistened with water and folded or crimped into ridges extending longitudinally of the strip by passing the paper through mating rolls with the proper circular ribs or projections thereon. The paper is then dried and impregnated with resin to increase its wet strength. It will be appreciated that this material is supplied or formed into long strips the width of which is to conform with the length of the filter element. The crimping of the paper is such that the ridges and grooves formed therein run longitudinally of the strip 18 for reasons to be explained hereinafter. Various forms of crimping may be employed. After impregnation, the longitudinal margins on one side of the strip 18 are treated with an adhesive 20 as shown in Fig. 3.

A strip 18 of suitable length for a given filter 10 is then formed into a loop by joining the ends with an adhesive. This loop is then placed around a core member 16 and folded into a plurality of double-wall filter pleats 22.

Figure 2:
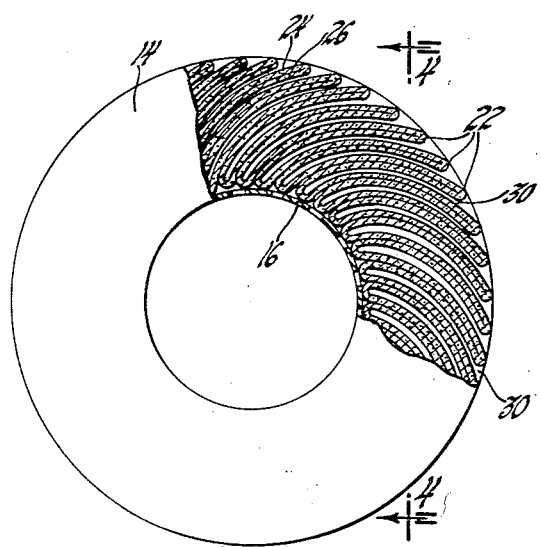
Fig. 2 is a bottom view of the filter shown in Fig. 1 with a portion broken away to illustrate the internal construction.

In forming each pleat 22, one side 24 of that pleat is made slightly wider than the other side 26 of that pleat and the arrangement is such that when the filter element is confined and the diameter thereof is restricted by a suitable enclosure or fixture, each of the annular arranged series of spaced pleats will assume the outwardly curved or spiral form as depicted in Fig. 2. It will be noted that each wall 24 or 26 of a given pleat 22 is spaced from an adjacent pleat. Proper relative proportions of the two sides 24 and 26, together with application of the requisite wrap-around effect by the fixture, results in a space or open pocket 30 being realized between adjacent pleats 22. Preferably, each space 30 is made of substantially constant width for approximately its full depth. This arrangement is possible because of the curved form of the outwardly extending pleats. Heretofore, it was not considered possible to retain the crimping of the sheet material when the pleats are curved as disclosed herein, but the crimping is retained to a surprising and substantial extent so that the desired effects are realized. It will be appreciated that the crimping operation does not change the original thickness of the paper and does not adversely affect the filtering capacity of a given area of the paper.

Figure 4:
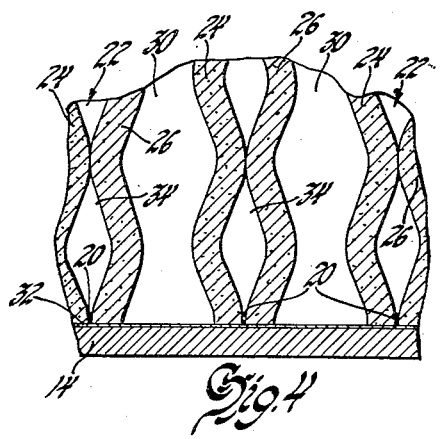
Fig. 4 is an enlarged and fragmentary sectional view taken along the line 4—4 of Fig. 2 and at one end of the filter with the latter being viewed in the upright position.

In forming the loop from the strip 18, it will be appreciated that the cement 20 is arranged to face inwardly—i. e.—is placed on the inner surface of the loop, to facilitate formation of the pleats. In forming the latter, the end margins of a given pleat 22 are placed in juxtaposition and firmly bonded together as shown in Fig. 4 to present a common edge.

With the annular series of pleats 22 surrounding the core member or tube 16 and each pleat 22 presenting two end edges, a coating 32 of an adhesive resin is then employed to join each of the two end plates 12 and 14 to those edges to produce a filter unit.

When the filter is placed in service the oil or other fluid to be treated is caused to come in contact with the outside surfaces of the walls 24 and 26 of each pleat 22 and for the full depth of the latter because of the presence of the spaces 30. This large area contact takes place even though some pleats may inadvertently contact each other because the crimping provides outwardly extending ridges or grooves assuring fluid flow between the pleats. Because of this construction, there is an extensive area of filter material provided in a compact space for intimate contact with the fluid to be treated and this contributes to efficient operation.

The spaces 30 are deliberately provided for in constructing the filter element but it should be understood that the outer folded edges of the pleats 22 may not be sharply creased in a particular and selected process of manufacture. In such an event, the construction is in the purview of the present invention for, although the pleats 22 before use may incidentally contact to some extent due to the blunt creasing, the basic construction will cause the pressure differential of the fluid being treated to "edge in" or open the spaces 30 and separate the pleats.

Because of the nature of each pleat 22, it will be seen that outwardly extending passages 34 are provided within each pleat whereby filtered fluid may pass inwardly and without restriction to the core member 16 for discharge. These multiple passages are defined by the crimped ridges extending into each pleat. Crimping or pressing the filter sheet material into small folds is far more advantageous than cutting or embossing grooves when the two aspects of cost and efficient operation are considered.

Due to the fact that the walls of each pleat 22 are joined at their adjacent end margins to form unitary edges before being joined to an end plate 12 or 14, the differential pressure of fluid is successfully withstood by the filter. The sides of each pleat are joined together or juxtaposed before pressure of the fluid is applied. When the fluid pressure is exerted, the sides are already in contact and the pressure cannot locally bend, stress and rupture the filter material to impair the filtering action.

I claim:

A filter of cylindrical configuration comprising a strip of filter material crimped to form ridges and grooves extending lengthwise of the strip, said strip being folded transversely into discrete and curved pleats separated by pockets extending inwardly and open substantially the full width of said pleats, each of said pleats consisting of an outwardly extending fold of said strip, the ridges of which contact along their lengths to define outwardly extending passages which are closed at their outer ends by said filter material and open only at their inner ends, each of the ends of said filter terminating at contacting ridges and having each of the end contacting ridges secured together to strengthen the resistance of said filter material against a rupture.

References Cited in the file of this patent

UNITED STATES PATENTS

| 2,189,704 | Campbell | Feb. 6, 1940 |
|---|---|---|
| 2,395,449 | Briggs | Feb. 26, 1946 |
| 2,627,350 | Wicks | Feb. 3, 1953 |
| 2,675,127 | Layte | Apr. 13, 1954 |
| 2,689,652 | Gretzinger | Sept. 21, 1954 |

FOREIGN PATENTS

| 588,991 | Great Britain | June 9, 1947 |